United States Patent [19]

Taniguchi et al.

[11] Patent Number: 4,936,997
[45] Date of Patent: Jun. 26, 1990

[54] METHOD OF FLUSHING DESALINATION APPARATUS EQUIPPED WITH REVERSE OSMOTIC MEMBRANE MODULE AND APPARATUS THEREFOR

[75] Inventors: Shin Taniguchi; Takayuki Abe; Etsuyo Mashima; Ichiro Ochiai, all of Tokyo, Japan

[73] Assignee: Ebara Corporation, Tokyo, Japan

[21] Appl. No.: 378,520

[22] PCT Filed: Oct. 6, 1987

[86] PCT No.: PCT/JP87/00748

§ 371 Date: Apr. 3, 1989

§ 102(e) Date: Apr. 3, 1989

[87] PCT Pub. No.: WO88/02651

PCT Pub. Date: Apr. 21, 1988

[30] Foreign Application Priority Data

Oct. 7, 1986 [JP] Japan .................... 61-237224

[51] Int. Cl.$^5$ .............................. B01D 13/00
[52] U.S. Cl. ....................... 210/637; 210/321.65
[58] Field of Search ............ 210/634, 637, 641, 642, 210/644, 649, 650, 651, 653–655, 321.65, 321.78

[56] References Cited

U.S. PATENT DOCUMENTS 3,922,220 11/1975 Middleman et al. .......... 210/321.78

Primary Examiner—Frank Sever
Attorney, Agent, or Firm—Armstrong, Nikaido, Marmelstein, Kubovcik & Murray

[57] ABSTRACT

A desalination method and apparatus for separating permeate water (WP) from raw water (WF) pressure-fed by a pump (PM) through a reverse osmotic membrane module (U) to discharge concentrated water (WB) from an outlet valve (V2). When the membrane performance of the reverse osmotic membrane module (U) deteriorates due to formation of a gel layer (G). The number of revolutions of a pump driving motor (MO) is reduced and the opening of the outlet valve (V2) is increased, thereby increasing the flow velocity inside the reverse osmotic membrane module (U) so that the gel layer (G) is removed by the raw water (WF). Provided are a number-of-revolutions control means (1) for controlling the number of revolutions of the motor (MO), an opening control means (2) for controlling the opening of the outlet valve (V2) and an operation means (5) for operating the number-of-revolutions control means (1) and the opening control means (2) when the membrane performance of the reverse osmotic membrane module (U) is lowered.

4 Claims, 6 Drawing Sheets

METHOD OF FLUSHING DESALINATION APPARATUS EQUIPPED WITH REVERSE OSMOTIC MEMBRANE MODULE AND APPARATUS THEREFOR

TECHNICAL FIELD

This invention relates to a method of flushing a desalination apparatus equipped with a reverse osmotic membrane module and an apparatus therefor.

BACKGROUND ART

As is well known, the construction of a desalination apparatus with a reverse osmotic membrane module is such that, as shown in FIG. 1, the reverse osmotic membrane module U is adapted to separate permeate water (pure water) WP from raw water (seawater) WF that is pressure-fed by a pump PM through a permeable membrane M, concentrated water (concentrated brine) WB being finally discharged from an outlet valve V2. In this kind of desalination apparatus, a gel layer G (FIG. 2) is formed on the permeable membrane M by contaminants, microbes or the like in the water over a long period of operation and thus the membrane performance or permeation performance deteriorates. It has thus been the practice to recover the permeation performance of the permeable membrane M by closing valve V1 at predetermined intervals of time T1 (once a month in the example shown), as shown by a dotted line A in FIG. 3, the gel layer G on the surface of the permeable membrane M then being dissolved and removed with a liquid chemical. Such removal operation is ordinarily performed at a given frequency within the range of from once every half a month to once every two months, depending on the specific operating conditions, such as the quality of raw water, the recovery rate, etc. Such being the case, certain problems are encountered since not only must the system be shut down, but also the cost of the liquid chemical and labour involved are considerable. These problems lead to an overall increase in the cost of the desalination.

DISCLOSURE OF INVENTION

An object of this invention is to provide a method of flushing a desalination apparatus having a reverse osmotic membrane and an apparatus therefor which can serve to reduce the number of times it is necessary to remove a gel layer with a liquid chemical.

The inventors of this invention found, as a result of various studies, that when a large quantity of low-pressure water is fed through a reverse osmotic membrane over a predetermined period of time, the total quantity of raw water flows to the outlet valve such as to increase the flow velocity through the reverse osmotic membrane, whereby the gel layer is removed by the shearing force of the flow of raw water. The present invention was accomplished having taken notice of this principle.

The present invention relates to a desalination method utilizing a reverse osmotic membrane module, by which means permeate water is separated from raw water pressure-fed by a pump through a reverse osmotic membrane, concentrated water being discharged from an outlet valve, wherein when the membrane performance of the reverse osmotic membrane module deteriorates due to a gel layer, the number of revolutions of a pump driving motor is reduced and the opening of the outlet valve is increased, thereby increasing the flow velocity inside the reverse osmotic membrane module so that the gel layer is removed by the raw water.

Further, the present invention relates to a desalination apparatus for separating by a reverse osmotic membrane module permeate water from raw water pressure-fed by a pump through a reverse osmotic membrane, concentrated water being discharged from an outlet valve, comprising a number-of-revolutions control means for controlling the number of revolutions of a pump driving motor, an opening control means for controlling the opening of the outlet valve and an operation device operable to control the number-of-revolutions control means and the opening control means to reduce the number of revolutions of the pump driving motor and increase the opening of the outlet valve when the membrane performance of the reverse osmotic membrane module is lowered.

According to the present invention, by reducing the number of revolutions of the pump and increasing the opening of the outlet valve, the pressure inside the reverse osmotic membrane module is reduced and the flow rate is increased, so that the quantity of water permeating through the reverse osmotic membrane module becomes substantially zero. The increased quantity of water makes the flow velocity high such as to allow the gel layer attached to the reverse osmotic membrane to be easily peeled off. Since the gel layer can be effectively be peeled off and removed by the shearing force of such a large quantity of high-velocity raw water flow, it is possible to make the interval of liquid chemical flushing twice that with a conventional apparatus, make the life of the reverse osmotic membrane 20 percent longer than that of a conventional apparatus, shorten the shut-down period of the desalination apparatus, and reduce the cost of desalination.

It is preferable in embodiments of the present invention to use an inverter or a fluid coupling as the number-of-revolutions control means.

It is preferable in embodiments of the present invention to use an electrical or pneumatic positioner as the opening control means.

In embodiments of the present invention, the operation device is preferably constructed by a timer and a controller. Such an arrangement is suitable for a steady operation.

It is preferable in embodiments of the invention to use as the operation device a control unit comprising a microcomputer which calculates the membrane performance from the flow rates, pressures and electric conductivities of any two of the raw water, permeate water and concentrated water, and which outputs control signals to the number-of-revolutions control means and the opening control means when the membrane performance reaches a predetermined value at which flushing is required. Such an arrangement is suitable for an unsteady operation.

BRIEF DESCRIPTION OF DRAWINGS

FIG. 9 is a diagram showing the construction of another embodiment of a desalination apparatus in accordance with the invention.

BEST MODE FOR CARRYING OUT THE INVENTION

Embodiments of the present invention will be described below with reference to the drawings.

Figure 4:
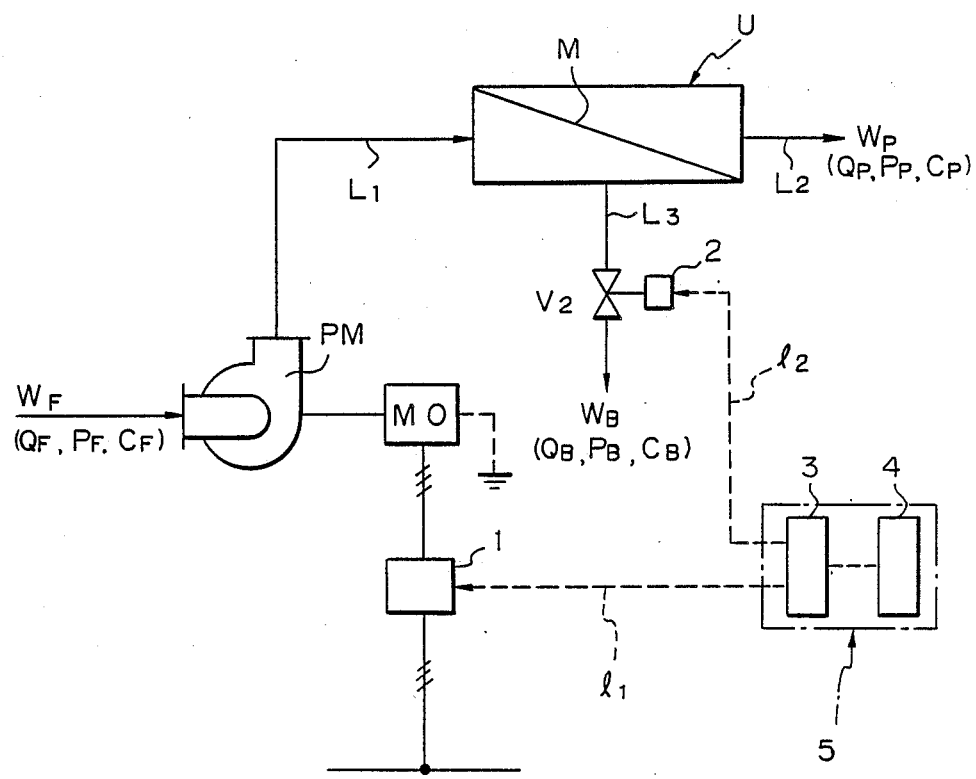
FIG. 4 is a diagram showing the construction of an embodiment of a desalination apparatus in accordance with the present invention.

FIG. 4 shows an embodiment for a steady operation. In this drawing, raw water WF is pressurized by a turbo-type pump PM driven by a motor MO and fed through a pipe line L1 to a reverse osmotic membrane module U. The reverse osmotic membrane module U separates permeate water WP from the raw water WF. The separated permeate water WP is recovered through a pipe line L2, while concentrated water WB is discharged by way of a pipe line L3 through an outlet valve V2.

Connected to the motor MO is a number-of-revolutions control means for controlling the number of revolutions of the motor, such as an inverter 1, and the outlet valve V2 is provided with an opening control means for controlling the opening thereof, for example, a positioner 2.

The inverter 1 and the positioner 2 are connected through wirings l1, l2, respectively, to a controller 3. To the controller 3 a timer 4 is connected, the controller 3 and the timer 4 constituting an operation device 5.

The operation device 5 outputs, in operation, a control signal of, for example, 8 mA to the inverter 1 at a predetermined time, i.e., when the membrane performance of the reverse osmotic membrane M of the reverse osmotic membrane module U has fallen to a predetermined level due to the formation of a gel layer G (at the time t shown in an enlarged figure of the portion enclosed by a circle shown in FIG. 3), and performs control to reduce the number of revolutions of the motor MO, which is normally controlled by the inverter 1 with a control signal of 18 mA, from 100% to 40%. The operation device 5 also outputs a control signal of, for example, 4 V to the positioner 2 and performs control to increase the opening of the outlet valve V2, which is normally controlled at 15% by the positioner 2 with a control signal of 2 V, to increase to 80%.

Figure 5:
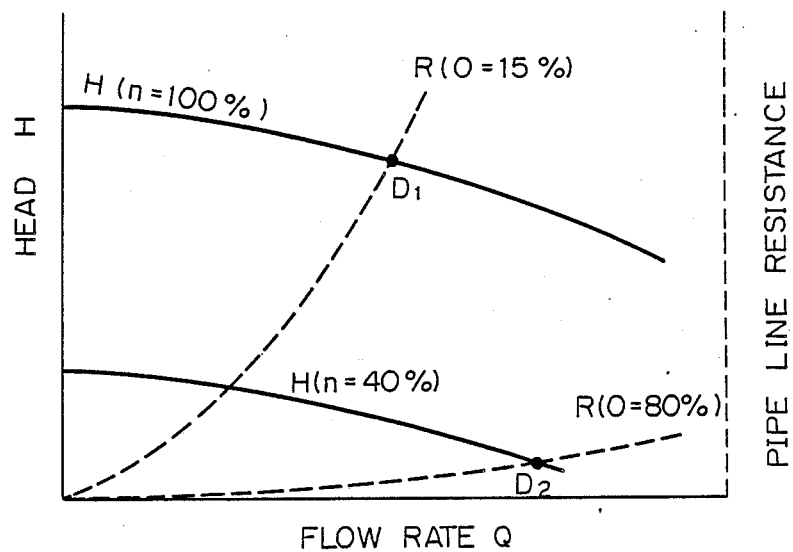
FIG. 5 is a diagram showing the characteristics of the pump in FIG. 4.

The characteristics of the pump P, i.e., the relationship between the head H (pressure) and the flow rate Q, are as shown in FIG. 5, and the resistance R of the pipe line increases in proportion to the flow rate Q. Normally, the pump is operated at the state corresponding to an intersection D1 of a curve of H (n=100%) and a curve of R (o=15%). If, for example, the number of revolutions n of the motor decreases to 40% and the outlet valve opening o increases to 80%, the head H falls to a curve H (n=40%) and the pipe line resistance R falls to a curve R (o=80%). Thus, the operation of the pump R becomes coincident with the intersection D2 between the two curves. This allows a large quantity of low-pressure raw water WF to flow into the reverse osmotic membrane module U. In this case, the power level required for operating the pump may be lower than that for the normal operation.

On the other hand, assume that the flow rate Q, pressure P and electric conductivity (representing the salt concentration) C of each of the raw water WF, permeate water WP and concentrated water WB are indicated by adding thereto subscripts F, P and B, respectively, and that the mean pressure is indicated by PM, the mean electric conductivity being indicated by CM, the membrane performance by A, and the osmotic pressure by $\pi M$. Then the following expressions are obtained:

$$PM = (P_F + P_B)/2 \tag{1}$$

$$CM = (C_F = C_B)/2 \tag{2}$$

$$\pi M = f(CM) \tag{3}$$

$$Q_P \approx A \cdot (PM - \pi M) \tag{4}$$

Figure 6:
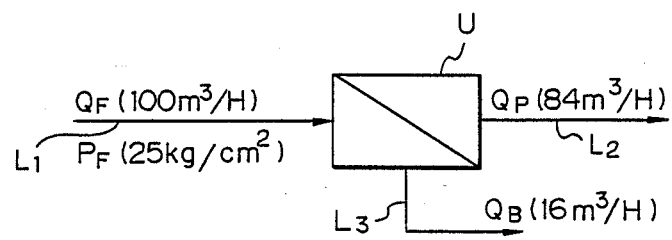
FIG. 6 is a diagram explaining the flow rate in a steady operation of the reverse osmotic membrane shown in FIG. 4.

Now, as shown in FIG. 6, for example, in the steady operation of $Q_F = 100$ m³/H and $P_F = 25$ kg/cm², the mean flow rate $QM = 116/2 = 58$ (m³/H) in the case of $Q_P = 84$ m³/H and $Q_B = 16$ m³/H.

Figure 1:
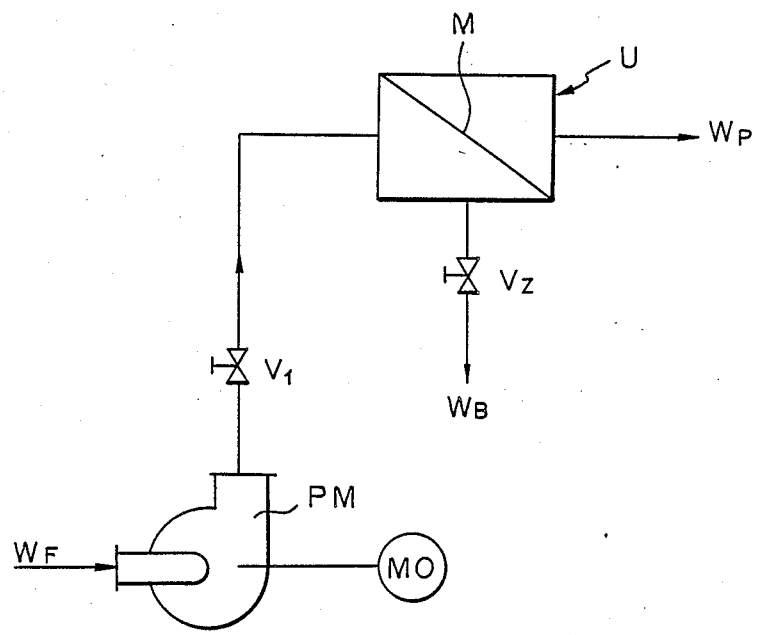
FIG. 1 is a diagram showing an example of a conventional desalination apparatus.
Figure 2:
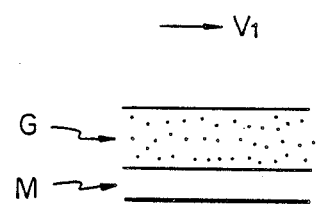
FIG. 2 is a diagram showing the state of a gel layer formed on a reverse osmotic membrane.
Figure 3:
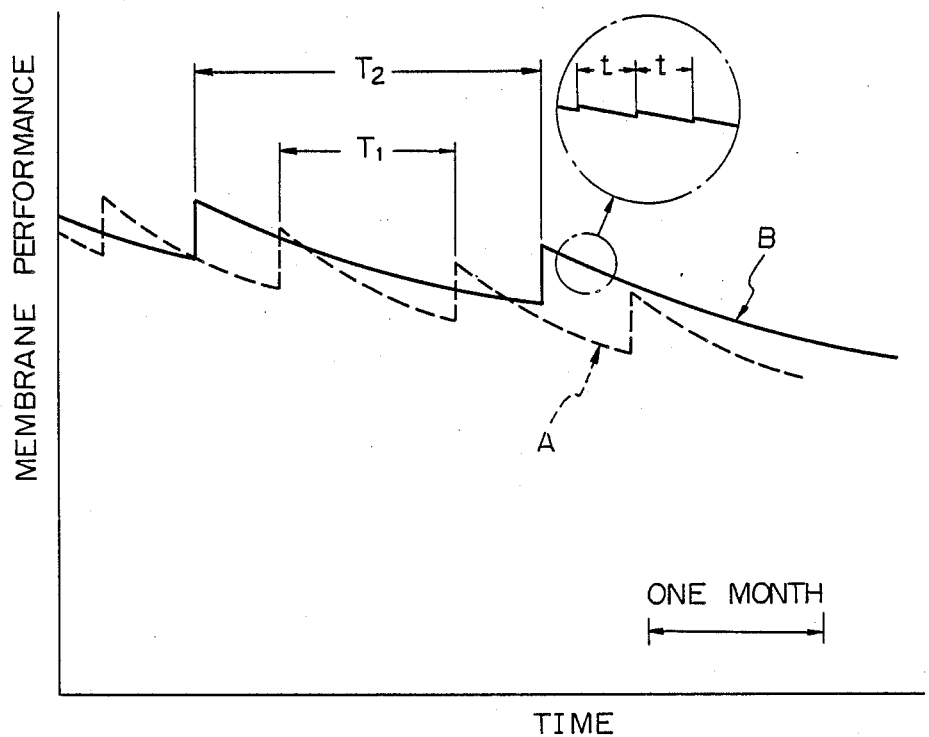
FIG. 3 is a flushing time chart showing the advantages of the present invention in comparison with the conventional apparatus.
Figure 7:
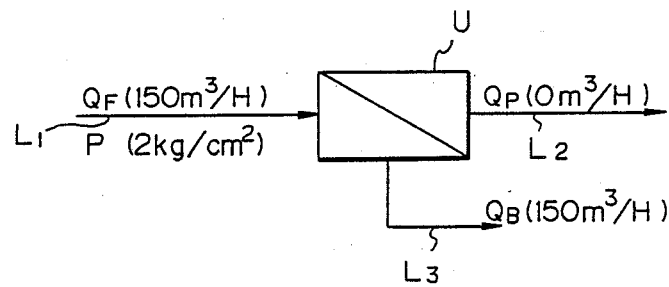
FIG. 7 is a diagram explaining the flow rate at the time of flushing the reverse osmotic membrane shown in FIG. 4.
Figure 8:
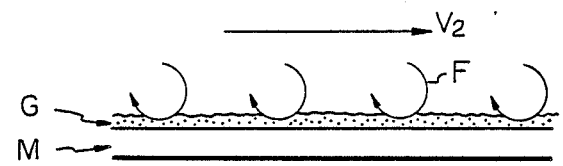
FIG. 8 is a diagram explaining an operation of removing the gel layer at the time of the flushing operation according to the present invention.

If this condition is changed to another condition of, for example, $Q_F = 150$ m³/H and $P_F = 2$ kg/cm², as shown in FIG. 7, PM of the expression (1) becomes low because $P_F$ is low and thus $PM = \pi M$. Accordingly, from the expression (4), $Q_P = 0$ (m³/H). That is, the whole quantity of raw water WF flows inside the reverse osmotic membrane module U and is discharged from the outlet valve V2. As a result, the flow velocity of the raw water WF inside the reverse osmotic membrane module is significantly increased from V1 (FIG. 2) to V2 which is more than 2.5 times V1, as shown in FIG. 8. By virtue of the shearing force generated by the high-speed flow of the large quantity of raw water, the gel layer G is effectively peeled off and removed. This is done at the predetermined time t, as shown in FIG. 3, thus making the membrane life 20% longer than that of a conventional apparatus, and the interval T2 of the liquid chemical flushing about 2 times the conventional interval T1.

FIG. 9 shows an embodiment for an unsteady operation, in which the pipe lines L1, L2 and L3 are provided with sensors 7F, 7P, 7B; 8F, 8P, 8B and 9F, 9P, 9B for detecting the flow rate $Q_F$, $Q_P$, $Q_B$, the pressure $P_F$, $P_P$, $P_B$, and the electric conductivity $C_F$, $C_P$, $C_B$ of the raw water WF, permeate water WP and concentrated water WB flowing through the respective pipe lines. These sensors, the inverter 1 and the positioner 2 are connected to a control unit 10, the operation device comprising, for example, a microcomputer. In operation, this control unit 10 computes the membrane performance A based on the signals from the respective sensors in accordance with the above-described expressions (1), (2), (3) and (4), and, when detecting that the membrane performance A has been lowered to a predetermined value at which flushing is required, outputs control signals to the inverter 1 and the positioner 2 to reduce the number of revolutions of the motor MO and increase the opening of the outlet valve V2. Then flushing similar to that in the above-described embodiment is effected.

Figure 10:
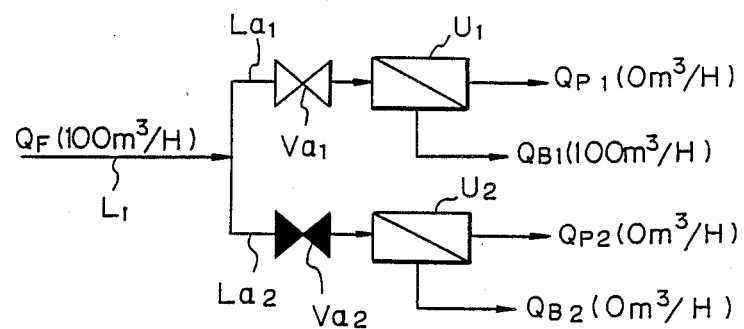
FIG. 10 is a diagram showing a modified example of a desalination apparatus in accordance with the present invention.

Moreover, in a case where a plurality of reverse osmotic membrane modules are juxtaposed, a valve may be provided in each pipe line for supplying the raw water to the respective reverse osmotic membrane modules. The flushing operation can be performed by opening one of the valves coupled to a corresponding reverse osmotic membrane module to be subjected to the flushing and by closing the remaining valves. For example, in the case where two reverse osmotic membrane modules are juxtaposed, as shown in FIG. 10, the reverse osmotic membrane modules U1 and U2 are connected in parallel through pipe lines La1 and La2 to the pipe line L1, and the pipe lines La1 and La2 are provided with change-over valves Va1 and Va2, respectively. Thus, by closing the change-over valve Va2 and opening the change-over valve Va1, for example, the flushing of the reverse osmotic membrane module U1 can be performed. Further, the reverse osmotic membrane modules U1 and U2 may be replaced with module blocks each comprising a plurality of modules.

INDUSTRIAL APPLICABILITY

As described above, the present invention produces the advantages that, because a gel layer attached to a reverse osmotic membrane can readily be removed, the intervals at which liquid chemical flushing is performed can be extended, the life of the reverse osmotic membrane becomes longer and the shut-down period of the apparatus is shortened. Therefore, the present invention is effective in the flushing of a desalination apparatus for desalinating raw water, such as seawater, sewerage water, etc., through a reverse osmotic membrane module.

We claim:

1. In a desalination method of separating permeate water from raw water pressure-fed by a pump through a reverse osmotic membrane module and discharging concentrated water from an outlet valve, a flushing method for a desalination apparatus having a reverse osmotic membrane module, the improvement comprising reducing the number of revolutions of a motor for driving said pump while increasing the opening of said outlet valve, when the membrane module deteriorates due to a gel layer, sufficient to increase the flow velocity inside said reverse osmotic membrane module so that the gel layer is removed by the raw water thereby reducing the number of times it is necessary to remove a gel layer with a liquid chemical.

2. A flushing method for a desalination apparatus having a reverse osmotic membrane module as set forth in claim 1, wherein the membrane performance is computed from the flow rates, pressures and electric conductivities of any two of the raw water, permeate water and concentrated water, and flushing is effected when the membrane performance falls to or below a predetermined value.

3. A method of flushing a reverse osmotic membrane module of a desalination apparatus which comprises a pump for pressure-feeding raw water, a motor for driving said pump, a number-of-revolutions control means for controlling the number of revolutions of said motor, a reverse osmotic membrane module for filtering the raw water pressure-fed from said pump to discharge concentrated water and permeate water, an outlet valve connected to said reverse osmotic membrane module for discharging the concentrated water, and an opening control means for controlling the opening of said outlet valve, comprising the steps of:

detecting a fall in the membrane performance of said reverse osmotic membrane module due to the formation of a gel layer;

operating said number-of-revolutions control means in response to the detection of the fall in the membrane performance to reduce the number of revolutions of said motor; and operating said opening control means in response to the detection of the fall in the membrane performance to increase the opening of said outlet valve;

such that the flow velocity of the raw water inside said reverse osmotic membrane module is increased, sufficient to flush said reverse osmotic membrane module and remove the gel layer, thereby reducing the number of times it is necessary to remove a gel layer with a liquid chemical.

4. A method of flushing as set forth in claim 3, wherein said step of detecting a fall in the membrane performance includes the steps of computing the membrane performance of said reverse osmotic membrane module based on the flow rates, pressures and electric conductivities of any two of the raw water, permeate water and concentrated water, and detecting the fact that the membrane performance has fallen to a predetermined value based on the computed result.

* * * * *